(12) United States Patent
Boeckx et al.

(10) Patent No.: US 9,713,575 B2
(45) Date of Patent: Jul. 25, 2017

(54) TABLET PRODUCTION MODULE AND METHOD FOR CONTINUOUS PRODUCTION OF TABLETS

(75) Inventors: Jurgen Boeckx, Steenokkerzeel (BE); Trevor Gordon Page, Southampton (GB); Michel Simon Waldron, Sauthampton (GB)

(73) Assignee: GEA PROCESS ENGINEERING LIMITED, Warrington (GB)

( * ) Notice: Subject to any disclaimer, the term of this patent is extended or adjusted under 35 U.S.C. 154(b) by 266 days.

(21) Appl. No.: 13/319,023

(22) PCT Filed: May 7, 2009

(86) PCT No.: PCT/IB2009/051885
§ 371 (c)(1),
(2), (4) Date: Nov. 22, 2011

(87) PCT Pub. No.: WO2010/128359
PCT Pub. Date: Nov. 11, 2010

(65) Prior Publication Data
US 2012/0061869 A1  Mar. 15, 2012

(51) Int. Cl.
*B29C 43/08* (2006.01)
*A61J 3/10* (2006.01)
(Continued)

(52) U.S. Cl.
CPC  *A61J 3/10* (2013.01); *B29B 7/48* (2013.01); *B29B 7/726* (2013.01); *B29B 13/065* (2013.01);
(Continued)

(58) Field of Classification Search
CPC ..... B29C 43/08; B29C 43/58; B29C 43/5808; B29C 43/5816; B29C 43/5833; B29C 43/5875
(Continued)

(56) References Cited

U.S. PATENT DOCUMENTS 5,504,332 A   4/1996 Richmond et al.
5,760,399 A   6/1998 Trygstad
(Continued)

FOREIGN PATENT DOCUMENTS

CN    1390120 A    1/2003
CN    1545445 A   11/2004
(Continued)

OTHER PUBLICATIONS

International Search Report for PCT/IB2009/051885, dated Jan. 25, 2010.
(Continued)

*Primary Examiner* — Joseph S Del Sole
*Assistant Examiner* — Thukhanh T Nguyen
(74) *Attorney, Agent, or Firm* — Sughrue Mion, PLLC

(57) ABSTRACT

The contained module (1) comprises inlets for an active pharmaceutical ingredient (API) and for an excipient. The inlets are in fluid communication with at least one mixing unit (41,46), and the outlet of the tablet press (6) is in fluid communication with the releasable outlet port for tablets. The material stream comprising the API and the excipient is mixed in the mixing units. During operation parameters of the contents of the material stream are measured with one or more analytical sensors upstream of the tablet press. The speed of the tablet press is controlled in response to the parameters measured upstream of the tablet press. The finished tablets are discharged at an outlet of the tablet press (6).

11 Claims, 8 Drawing Sheets

(51) Int. Cl.

| | | |
|---|---|---|
| *B30B 11/00* | (2006.01) | |
| *B29B 7/48* | (2006.01) | |
| *B29B 7/72* | (2006.01) | |
| *B29B 13/06* | (2006.01) | |
| *B29C 43/02* | (2006.01) | |
| *B29C 43/34* | (2006.01) | |
| *B29C 43/50* | (2006.01) | |
| *B29C 43/58* | (2006.01) | |
| *B30B 15/30* | (2006.01) | |
| *B29K 105/00* | (2006.01) | |

(52) U.S. Cl.
CPC .............. *B29C 43/02* (2013.01); *B29C 43/34* (2013.01); *B29C 43/50* (2013.01); *B29C 43/58* (2013.01); *B30B 11/005* (2013.01); *B30B 15/308* (2013.01); *B29C 2043/5833* (2013.01); *B29K 2105/0035* (2013.01); *B29K 2105/251* (2013.01)

(58) Field of Classification Search
USPC .................. 425/143, 170–171, 78, 344–345; 700/197, 206; 141/71, 74, 78
See application file for complete search history.

(56) References Cited

U.S. PATENT DOCUMENTS

| | | | |
|---|---|---|---|
| 5,873,360 A | 2/1999 | Davies et al. | |
| 6,318,650 B1 | 11/2001 | Breitenbach et al. | |
| 7,140,856 B2 * | 11/2006 | Zeddies et al. | 425/78 |
| 7,713,469 B2 * | 5/2010 | Schmidt et al. | 425/345 |
| 8,765,176 B2 | 7/2014 | Yamamoto et al. | |
| 2001/0043848 A1 | 11/2001 | Boos | |
| 2004/0012781 A1 | 1/2004 | Gehrlein et al. | |
| 2004/0131675 A1 | 7/2004 | Yamamoto et al. | |
| 2005/0137735 A1 | 6/2005 | Loy et al. | |
| 2007/0251596 A1 | 11/2007 | Scherzer et al. | |
| 2007/0264328 A1 | 11/2007 | Ghebre-Sellassie et al. | |
| 2010/0126622 A1 | 5/2010 | Koch et al. | |
| 2010/0221374 A1 * | 9/2010 | Le Floc'h | 425/94 |

FOREIGN PATENT DOCUMENTS

| | | |
|---|---|---|
| DE | 4342962 C1 | 2/1995 |
| DE | 9416619 U1 | 2/1995 |
| DE | 4315680 C2 | 2/1996 |
| DE | 102004008321 B3 | 11/2005 |
| DE | 60212084 T2 | 11/2006 |
| DE | 102005061787 A1 | 6/2007 |
| DE | 102006017196 A1 | 9/2008 |
| EP | 0 275 834 A1 | 7/1988 |
| EP | 1157736 A1 | 11/2001 |
| EP | 1216748 A1 | 6/2002 |
| EP | 1222917 A1 | 7/2002 |
| EP | 1568480 A2 | 8/2005 |
| EP | 1600761 A1 | 11/2005 |
| EP | 1423260 B1 | 1/2007 |
| JP | 61133131 A | 6/1986 |
| JP | 04-34445 A | 11/1992 |
| JP | 09271996 A | 10/1997 |
| JP | 11-276553 A | 10/1999 |
| JP | 2003267480 A | 9/2003 |
| JP | 2008183168 A | 8/2008 |
| WO | 8706434 A1 | 11/1987 |
| WO | 9718839 A1 | 5/1997 |
| WO | 0189679 A2 | 11/2001 |
| WO | 03/020499 A1 | 3/2003 |
| WO | 03/070149 A1 | 8/2003 |
| WO | 2007130478 A2 | 11/2007 |
| WO | 2007132281 A1 | 11/2007 |
| WO | 2008/056021 A2 | 5/2008 |
| WO | 2008/104923 A2 | 9/2008 |
| WO | 2009022821 A2 | 2/2009 |
| WO | 2009130539 A1 | 10/2009 |
| WO | 2009/134848 A1 | 11/2009 |

OTHER PUBLICATIONS

Wikipedia "Tablette", Version vom, Apr. 7, 2009, 7 pages total.
Statutory declaration of Mr Rainer Lemperle, 1 page total.
Technical Drawing No. 114327 a-1 from Jan. 17, 2008 the company Lodige, 1 page total.
Technical Drawing No. 875073 f-1 from Nov. 26, 2007 the company Lodige, 2 pages total.
Delivery from May 19, 2009 the company Lodige, 1 page total.
Statutory declaration of Mr Horst Spittka, 1 page total.
Plant for sworn declaration of the Lord Host Spittka, 16 pages total.
Communication dated Mar. 22, 2013, issued by the Japan Patent Office in corresponding Japanese Application No. 2012-509101.
Curriculum Vitae, Lecture by Dr. Christian Ober, Pfizer GmbH, 5 pages total.
Communication dated Jul. 4, 2014, issued by the European Patent Office in corresponding European Application No. 09786382.3.
Communication dated Sep. 12, 2014, issued by the European Patent Office in corresponding European Application No. 09786382.3.
Ghee Kong Lai et al., "Nondestructive and On-line Monitoring of Tablets Using Light-Induced Fluorescence Technology", AAPS PharmSciTech 2004; 5(1) Article 3 (http://www.aapspharmscitech.org), Nov. 13, 2003.
Karl Molt et al., "Quantitative Near Infrared Spectrometry Used for the Determination of the Drug Content of Tolbutamide Tablets", Pharm. Ind., 1996, vol. 58, No. 9, pp. 847 to 852.
Fernando Muzzio, "Invitation to join C-SOPS: The Engineering Research Center on Structured Organic Particle Systems", Rutgers, Purdue, New Jersey IT, and Univ. of Puerto Rico, 28 pages total.
Fernando Muzzio, "NSF ERC on Structured Organic Particulate Systems", Rutgers, Purdue, New Jersey IT, and Univ. of Puerto Rico, Nov. 9, 2007, 39 pages total.
Fernando Muzzio, "PAT: Doing it Right", Rutgers, Seminar presented at CDER-FDA, May 1, 2003, 85 pages total.
Fernando Muzzio et al., "C-SOPS: The Engineering Research Center on Structured Organic Particulate Systems", Rutgers, Purdue, New Jersey IT, and Univ. Puerto Rico, Oct. 20, 2006, 99 pages total.
Fernando Muzzio, "Model Based Design, Optimization, and Control of Pharmaceutical Products and Processes", Rutgers, Purdue, New Jersey IT, and Univ. of Puerto Rico, presented at the Pharmaceutical Technology Annual Meeting, Jun. 12, 2006, 58 pages total.
Fernando Muzzio et al., C-SOPS—The Center for Structured Organic Particulate Systems, First-Year Annual Report, Rutgers, Purdue, New Jersey IT, Univ. of Puerto Rico, Dec. 21, 2007, 258 pages total.
Fernando Muzzio, "Study of Continuous Methods for Manufacturing of Solid-Dose Pharmaceutical Products", a Research Proposal, Revised Version, Rutgers, 11 pages total.
Andreas Schade, Herstellung von pharmazeutischen Granulaten in einem kombinierten Feuchtgranulations- und Mehrkammer-Wirbelschichttrocknungs-Verfahren, Dissertation, 1992, 2 pages total.
Christoph Wabel, "Secondary Case Study 1: Opportunities and Challenges in Continuous Processing", Continuous Processing in the Real World, Pfizer, Sep. 22, 2006, 7 pages total.
Mike Cliff et al., "Secondary Case Study 2: Development, Operation and Implementation of a Micro Continuous Granulator/Dryer", Continuous Processing in the Real World, AstraZeneca, GlaxoSmithKline Sep. 22, 2006, 3 pages total.
Benno Dorr, "Entwicklung einer Anlage zur quasikontinuierlichen Feuchtgranulierung und Mehrkammer-Wirbelschichttrocknung von pharmazeutischen Granulaten", Disseration, 1996, 5 pages total.
Communication dated Jul. 15, 2014, issued by the European Patent Office in corresponding European Application No. 09786382.3.
GEA Pharma Systems, "Examples of Buck Containment Interfaces in the Pharmaceutical Industry for oral sold dosage", Jan. 8, 2009, 1 page total.

(56) References Cited

OTHER PUBLICATIONS

GEA Pharma Systems, "Benefits of Buck Valves for IBC Blending", Jan. 8, 2009, 1 page total.
GEA Pharma System, "Benefits using Buck Split Valves for Tablet Compression", Jan. 8, 2009, 1 page total.
GEA Pharma Systems, "The Buck Hicoflex—materials handling for flexible transport containers", Dec. 2, 2008, 1 page total.
GEA Pharma Systems, "Production of Batch Oral Solid Dosage Forms", Mar. 15, 2009, 1 page total.
GEA Pharma Systems, "Buck Hicoflex Typical Applications", Jan. 6, 2009, 1 page total.
GEA Pharma Systems, "GEA Pharma Systems exhibit overview", 2008, 1 page total.
GEA Pharma Systems, "Seminars @ Achema 2009: Consigma Continuous Granulation for improved tablet quality", 2009, 1 page total.
GEA Pharma Systems, "Consigma continuous high-shear granulation and drying system will be demonstrated at Achema", 2009, 1 page total.
Ralf Weinekotter, "Compact and efficient continuous mixing processes for production of food and pharmaceutical powders", Trends in Food Science & Technology, vol. 20, 2009, S48-S50, 3 pages total.
ScienceDirect, "Compact and efficient continuous mixing processes for production of food and pharmaceutical powders", Trends in Food Science & Technology, 2009, 1 page total.
Communication dated Aug. 12, 2014, issued by the European Patent Office in corresponding European Application No. 09786382.3.
Communication dated Jul. 29, 2014, issued by the European Patent Office in corresponding European Application No. 09786382.3.
Weinekötter et al., "Continuous Mixing of Fine Particles", Part. Part. Syst. Charact., 1995, vol. 12, pp. 46-53.
Weinekötter et al., "Mischen von Feststoffen", Springer-Verlag, 1995, ISBN 3-540-58567-2, pp. 78-79 (4 pgs. total).
"Aluminium hydroxide", From Wikipedia, the free encyclopedia, Online [https://en.wikipedia.org/wiki/Aluminium_hydroxide], Retrieved Mar. 23, 2016, 6 pgs. total.
"Blister pack", From Wikipedia, the free encyclopedia, Online [https://en.wikipedia.org/wiki/Blister_pack], Retrieved Mar. 23, 2016, 5 pgs. total.
Marikh et al., "Experimental study of the stirring conditions taking place in a pilot plant continuous mixer of particulate solids", Powder Technology, 2005, vol. 157, pp. 138-143.
Fachausschuss Chemie, "Sicheres Arbeiten in der pharmazeutischen Industrie", Deutsche Gesetzliche Unfallversicherung, Apr. 2009, ISBN: 978-3-86825-143-2, 5 pgs. total.
Communication dated Mar. 31, 2016, issued by the European Patent Office in corresponding European Application No. 09786382.3.
Communication dated Apr. 1, 2016, issued by the European Patent Office in corresponding European Application No. 09786382.3.
Communication dated Apr. 27, 2015 from the Japanese Patent Office.
Excerpt from a certification carried out on machinery in 2006.
Fette Compacting Brochure, Leitz Metalworking Technology Group, printed in Germany Nr. 8273 (0406 J), issued Apr. 2006.
Summons to attend oral proceedings pursuant to Rule 115(1) EPC, issued Nov. 6, 2015 in European Patent Application No. 09786382.3.

\* cited by examiner

TABLET PRODUCTION MODULE AND METHOD FOR CONTINUOUS PRODUCTION OF TABLETS

CROSS REFERENCE TO RELATED APPLICATIONS

This application is a National Stage of International Application No. PCT/IB2009/051885 filed on May 7, 2009, the contents of all of which are incorporated herein by reference in their entirety.

FIELD OF THE INVENTION

The present invention relates to a module for production of tablets, the module comprising: at least one inlet for an active pharmaceutical ingredient (API); at least one inlet for an excipient; at least one mixing unit; at least one analytical sensor; a tablet press; and at least one outlet for tablets. Furthermore, the invention relates to a method for continuous production of tablets.

BACKGROUND OF THE INVENTION

Within the pharmaceutical industry there is an increasing interest in providing products of a higher quality. Streamlining of a process line by including probes or sensors capable of in-line or on-line analysis may provide increased product quality and process efficiency, by making it possible to obtain analytical results before and after each step allowing each unit operation to be controlled on the basis of these results. In addition, still stricter requirements to process reproducibility and safety are to be expected from authorities granting marketing authorisations. Recent ideas behind how pharmaceutical processes should be designed and performed have been formulated as a set of guidelines by the Food and Drug Administration (FDA) in the USA. The FDA uses the term "Process Analytical Technology" (PAT), and in their Guidance for Industry regarding PAT (dated September 2004), it is stated that "the Agency considers PAT to be a system for designing, analysing, and controlling manufacturing through timely measurements (i.e., during processing) of critical quality and performance attributes of raw and in-process materials and processes, with the goal of ensuring final product quality. It is important to note that the term analytical in PAT is viewed broadly to include chemical, physical, microbiological, mathematical, and risk analysis conducted in an integrated manner. The goal of PAT is to enhance understanding and control the manufacturing process, which is consistent with our current drug quality system: quality cannot be tested into products; it should be built-in or should be by design. Consequently, the tools and principles described in this guidance should be used for gaining process understanding and can also be used to meet the regulatory requirements for validating and controlling the manufacturing process." An example of a virtual platform to facilitate automated production is given in US2005/0137735, wherein a plan for handling information streams and applying the information in a process design is suggested.

In addition to improving the processing efficiency there is a general interest in providing processes that are both environmentally safer and also pose a reduced risk to an operator of the process. In particular, in a process to produce tablets from active pharmaceutical ingredients (API) and various excipients in a powdery form may require the operator to wear a protective breathing apparatus, or otherwise personal protective equipment, like gloves or coverall, to prevent excessive exposure to the API and also the excipients. Reduction of the risk of contamination of the surrounding environment as well as exposure of the operator to a pharmaceutical product in a tabletting process was addressed in WO03/020499 (Courtoy), wherein a rotary tablet press was described.

However, WO03/020499 does not take into account the interest in providing better process control as it is described in the PAT guidelines of the FDA.

Typical manufacturing processes employed within the pharmaceutical field until now are of a batch nature. Batch manufacturing processes have a number of advantages and provide satisfactory results within many areas. However, due the increasingly widespread application of PAT criteria for monitoring and controlling in particular pharmaceutical manufacturing processes, and to the general increase in the demands to quality by design, the level of quality of monitoring and control attainable by a batch process is often not sufficient, i.a. due to the fact that settings are fixed. Furthermore, a relatively large buffer volume is required, entailing undesired back-mixing of the material stream and a limited traceability of the manufactured product. As a consequence, manufacturers' and customers' focus of interest has shifted to continuous processes, in which settings may be varied and are allowed to change within a design space. In order to achieve more production output with a batch process, bigger equipment and bigger buffer volumes, with different process settings to attain the same output, would be required. This is known as the scale-up problem. More output with a continuous process just requires longer running, with the ability to maintain the same settings. Further advantages of the continuous process include the ability to provide real-time release and its inherent advantages: Less product in stock, less quality testing, faster time-to-market, less costs involved etc. Furthermore, there is an increased interest for more robust processing equipment and for the ability to control more incoming variation, while maintaining tablet quality.

One example of a continuous process for producing tablets is described in EP 0 275 834 A1, in which two or more ingredients are fed into the process line at various feed or inlet points, and the ingredients are mixed, dried and subsequently compacted in a conventional tabletting machine. The process line includes a first mixing unit, a drying unit, a sizing unit and a second mixing unit.

Ideally, the output from the tabletting machine corresponds to the aggregated input of ingredients at the feed or inlet points, i.e. all of the material is fed to the tabletting machine in a continuous flow and at a constant rate. Due to a variety of factors, this is not feasible in practice. First, it is under any circumstances almost impossible to adjust the output from the mixing and drying units to provide a just-in-time supply of material to the tabletting machine. Second, the continuous production of tablets of a desired high level of quality requires careful monitoring, controlling and adjustment of process parameters in order to avoid a large rejection number from the tabletting machine. This may lead to accumulation of material along the process line awaiting adjustment of certain process parameters. In turn, this inevitably necessitates the use of intermediate buffer vessels in order to store material upstream of the tablet press.

SUMMARY OF THE INVENTION

On this background, it is an object of the present invention to provide a module for production of tablets and a tabletting process in which the overall operational conditions are improved. It is furthermore an object of the invention to reduce the risk of exposure of the operator to powders of API and excipients when operating the apparatus.

In a first aspect, these and further objects are met by a module for production of tablets comprising: at least one inlet for an active pharmaceutical ingredient (API); at least one inlet for an excipient; at least one mixing unit; at least one analytical sensor; a tablet press; and at least one outlet for tablets; said module being characterized in that said inlets are in fluid communication with an inlet of the at least one mixing unit, an outlet of the at least one mixing unit is in fluid communication with an inlet of the tablet press, and an outlet of the tablet press is in fluid communication with the outlet for tablets; that the module is contained; and that said at least one analytical sensor is positioned to analyse the contents or properties upstream of the tablet press.

By this design of the tablet production module, all units of the tabletting process may be contained, thus reducing the risk of operator exposure and facilitating operation of the tablet press, as all preparations of the material stream fed to the tablet press are carried out in a contained and controlled manner. The term "contained" within the context of the present application is defined by its level of containment according to suitable measurements, and is defined as at least dust-tight.

In another aspect, a method for continuous production of tablets is provided, the method including the following steps: providing a contained module comprising at least two inlets, at least one mixing unit, at least one analytical sensor, a tablet press, and at least one outlet for tablets; feeding an active pharmaceutical ingredient (API) to one of said at least two inlets; feeding an excipient to the other of said at least two inlets; mixing the material stream comprising the API and the excipient in said at least one mixing unit; measuring parameters of the contents of the material stream with said at least one analytical sensor upstream of the tablet press; controlling said two inlets and/or said mixing unit in response to the parameters measured; continuously supplying the tablet press with the material stream; controlling the speed of the tablet press in response to the parameters measured upstream of the tablet press, and discharging tablets at said at least one outlet.

In contradistinction to prior art methods, the method according to the invention is fully continuous as every unit in the process line may be run without interruption and without the need for large buffer volumes along the line. This fully continuous feature is made possible by the arrangement of sensors upstream of the tablet press. This provides for a uniform quality of the material fed to the tablet press, as the monitoring, controlling and adjustment is carried out on the units located upstream of the tablet press, the material fed to the tablet press thus being of a high, substantially constant quality. Furthermore, controlling the speed of the tablet press makes it possible to adjust the tablet press to the conditions upstream of the press. Thus, in the method according to the invention the improvement of the overall operational conditions aimed at have been attained, thus in turn improving the process efficiency as regards speed and quality, and eventually, the number of rejected tablets is brought down to a minimum Further details and advantages appear from the dependent claims, and from the detailed description of preferred embodiments and examples for carrying out the method set forth below.

DETAILED DESCRIPTION OF THE INVENTION AND OF PREFERRED EMBODIMENTS

Figure 1:
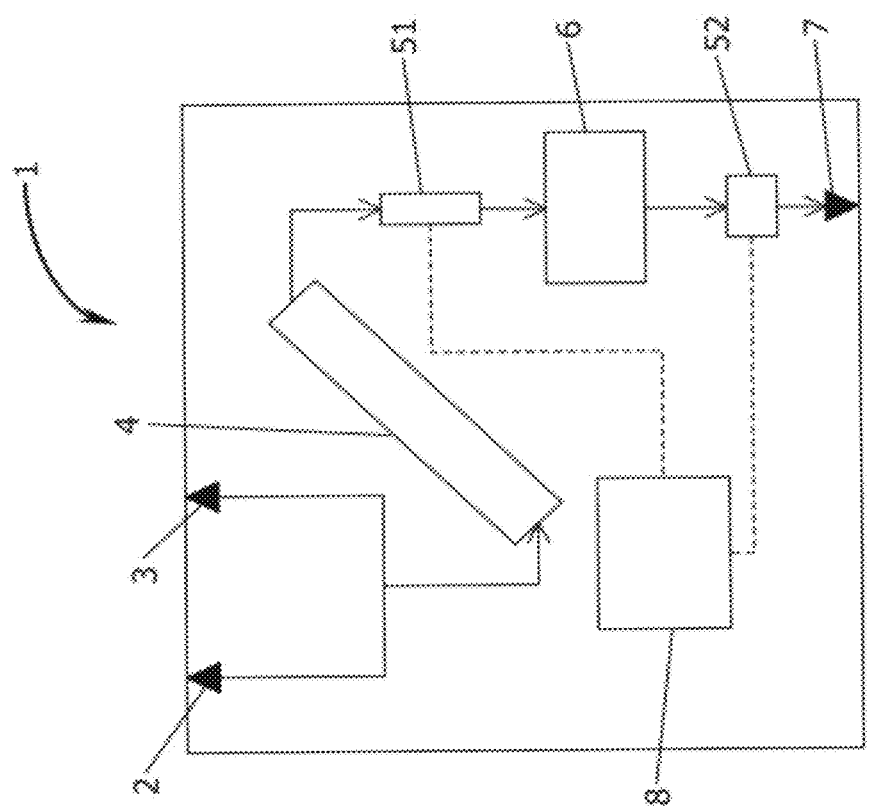
FIG. 1 shows a schematic drawing of an embodiment of a contained module of the invention.

Referring now to the Figures, FIG. 1 shows a schematic illustration of a module 1 according to the invention. The module 1 is a contained module, and the term "contained" is to be described in further detail below. In general in the Figures, streams of material (flow of raw material, granulate, tablets etc.) and their direction are indicated with arrows, whereas information flow from analytical sensors are indicated with punctuated lines with no indication of a direction of flow. In the embodiment of FIG. 1, the contained module 1 has two inlets in the form of a releasable inlet conduit 2 for an active pharmaceutical ingredients (API) and a releasable inlet conduit 3 for an excipient. The releasable inlet conduits 2,3 are in fluid communication with an inlet of mixing unit 4. In the context of the present invention the term "mixing unit" should be understood in its broadest terms. Thus, the mixing unit refers to a unit operation generally capable of mixing two or more components into a desired form. For example, a mixing unit may be capable of mixing two dry components, such as powders or granulates, into a mixture with a desired degree of homogeneity, such as substantially homogeneous. The mixing unit may also be capable of modifying the physical form of dry components processed in the mixing unit, e.g. a feed stream of two or more powders may be converted to a granulate comprising the powder components. The mixing unit may be a granulator for making a granulate from dry powders, such as a dry granulator or roller compactor. Furthermore, the mixing unit may include such equipment as a dry blender, a continuous dry blender or the like. The module may also comprise a wet granulator as a mixing unit wherein the powders are granulated using a granulation liquid. It is preferred that the mixing unit is a granulator capable of producing a granulate from powders, such as fine powders. At one point along the process line, a drying unit may be provided, such as a fluid bed dryer.

The material stream from mixing unit 4 may be analysed with an analytical sensor 51 before being conducted to an inlet of a tablet press 6. The tablet press 6 may be of any kind allowing suitable controlling of the settings of the press, such as speed, overfill height, feeder paddle speed, fill height, pre-compression force, pre-compression displacement, main compression force, and/or main compression displacement. Controlling the settings of the tablet press may involve controlling the compression profile, i.e. the height and width and/or the shape of the compression force-time curve per tablet, and/or the compression energy per tablet. One example of a method of controlling such a tablet press is disclosed in WO 2007/132281 (Courtoy). An example of a tablet press including a compression unit which is arranged detachably in the compression section of the press housing is disclosed WO03/020499 (Courtoy). Both of these documents are incorporated herein by reference. Tablets leaving tablet press 6 may be analysed using analytical sensor 52 before being conducted to an outlet, in the embodiment shown a releasable outlet port 7 for a tablet. Although such rotary tablet presses as the above-mentioned are most advantageous, the use of other tablet making devices is conceivable as well. Such devices for producing tablets or tablet-like shapes, may include a briquetting press, an extruder and a spheronizer, an extruder and a slicer or the like.

The module of the invention comprises an "analytical sensor". Any analytical sensor appropriate for a given tabletting process may be employed. The analytical sensor may be adapted for optical analysis within the electromagnetic spectrum, and the analytical sensor may be capable of analysing parameters of tablets produced, such as weight, thickness and hardness, and/or chemical content, friability, disintegration, dissolution etc. The module may also contain several sensors, which may be of the same or different types. The sensors are intended for analysing the contents or properties of the material stream upstream of the tablet press, i.e., the sensors should in principle be capable of analysing a number of parameters of the powder produced. Examples of parameters to be measured are for instance the mass flow rate and the volume flow rate of the powder flow, and the density, particle size, moisture, API concentration, excipients concentration, compressibility, flow, etc. An analytical sensor may be located at any stage in a process to be carried out in the module of the invention. For example, an optical analytical sensor may analyse the API or an excipient entering the module via the respective inlet conduits, the material during mixing or granulation, material leaving a mixing unit, material entering the tablet press or tablets leaving the tablet press. Tablets leaving the tablet press may also be analysed for other parameter values, such as weight, thickness and hardness. An appropriate optical analytical sensor is described in the international application PCT/IB2008/051552, the contents of which are hereby incorporated by reference. A sensor for optical analysis may be contained in a "probe" further comprising other technical parts, such as a transmitting light guide, a receiving light guide, a measuring window, a deflecting mirror, and the probe may also comprise a calibrating element for calibrating the analytical sensor. Calibration may take the form of white balancing using an appropriate white standard calibration element, or the element may be a black standard calibration element or another type of calibration element as are well known within the art. The probe may further comprise a light source and a fibre-optic collector. Optical analysis may be performed in a reflective, transmissive or transflective mode. The use of an electromagnetic system (microwave or other EM spectral device) to measure the weight and density of the tablets produced and where the information from this sensor is used to control both the tablet press operation and the operation of the feed preparation systems which may include blending, dry granulation, fluid bed granulation, wet granulation, and/or particle formation by spray drying. In addition, the analytical sensor 52 downstream the tablet press 6 to analyze the contents or properties of the tablets ensures that any such features may be used in the production process. One example is the measurement of the density of the tablet by means of a tablet density sensor as an analytical sensor, the results of which may be used to continuously predict the dissolution properties of the tablets produced and to control the dissolution properties of the tablets produced, by controlling the unit operations upstream of the tablet press, or by controlling the tablet press. Not only the tablet density sensor can be used to control the dissolution properties, but any analytical sensor, wherever placed.

The module of FIG. 1 further has a control unit 8 capable of communicating with the analytical sensors 51,52 (as indicated with the punctuated lines). Control unit 8 may also communicate with the unit operations of the module 1 in order to send commands and thereby control the unit operations (lines of communication not shown). The module may furthermore comprise a "data processing unit". With this term is meant a computer or similar device, which is capable of collecting signals from the analytical sensor(s) and converting them to data understandable to an operator. Data collected by the analytic sensor(s) may be presented to the operator in any appropriate way. The conversion of the data may involve simple statistical analysis, or the data may be analysed using "multivariate analysis", such as principal component analysis (PCA), principal component regression (PCR), partial least squares (PLS) or interval PLS (iPLS) modelling; multivariate statistical analysis is well-known within the field, and other techniques will be known to a person skilled in the art. Alternatively, the data is supplied to an external unit for processing. The control unit receives data or input from the data processing unit and/or, directly or indirectly, from the operator and send commands to the different unit operations contained in the module, e.g. to actuators controlling connection of API and excipient containers with the respective inlet conduits and the flow-rate of API and excipient to the mixing unit, to the mixing unit to control the processing rate in the mixing unit, to control the flow-rate of material applied to the tablet press, and the tablet compression speed (e.g. the turret speed of a rotary tablet press), and to actuators controlling connection of the product container with the outlet port. The control unit may for instance be adapted to control the compression profile, independently of the press speed. Alternatively, the control unit may be adapted to control the compression energy, independently of the press speed. The control unit may also control the analytical sensor(s) of the module, e.g. to control when and where an analysis is performed and the exact type of analysis to perform. It is conceivable to integrate the data processing unit and the control unit into one unit; such an integrated unit may invariably be referred to as a "control unit" so that unless otherwise indicated a control unit will also have the capabilities ascribed to the data processing unit above. In the case of pharmaceutical manufacturing processes optical or electromagnetic methods are appropriate for analysis of solid, particulate materials. Such methods, based on for example photometric, spectrophotometric or image analysis of powders, bulk materials, granules and the like, may be employed directly on materials, and appropriate analytical probes may be integrated in the manufacturing equipment. Examples of appropriate optical- or electromagnetic spectroscopic analytical methods comprise reflection/remission or transreflection (UV, VIS, NIR, IR), fluorescence or laser induced fluorescence (LIF), bio- or chemiluminescence or Raman spectroscopy. Optical analysis is also appropriate for liquid materials. Controlling the speed of the press could in principle mean varying the rotational speed of the turret of the tablet press; however, it is conceivable within the context of the present invention to include intermittent operation within the concept of "speed control".

In order to make it possible to evaluate any difference between the in-line analyses with more traditionally acquired values, a cross-validation sampler may also be provided in the module. A cross-validation sampler may involve a complementary set of connections similar to those described above, so that a sample can be withdraw without dismantled the module or even interrupting the process performed in the module. The connection of the cross-validation sampler will be in communication with the material stream to be analysed for cross-validation; for example, via a tube or slide or the like allowing material to be withdrawn with the aid of gravity or by creating negative relative pressure in a tube. By providing the cross-validation sampler in this manner, it is possible to analyse the same sample analysed in the module as in the subsequent analyses on the basis of the cross-validation sampler.

Containment in tablet compression has been the focus of attention for a number of years, i.a., due to the increased awareness of the potential risk of operator exposure to the highly potent substances often involved within the pharmaceutical field. Exposure data may be evaluated for instance by a SMEPAC (Standardized Measurement of Equipment Particulate Airborne Concentration) test. SMEPAC has been adopted into the ISPE-Guide "Assessing the Particulate Containment Performance of Pharmaceutical Equipment" (ISBN: 1-931879-35-4). Within the context of the invention the term "contained" means that the unit operations employed in the process to form tablets from e.g. powders of an API and excipients are contained in the module, which are therefore segregated from the surrounding environment. Thus, the operator does not need to have any direct access to the individual unit operations during operation, which may be accesses via the respective releasable inlet conduits and outlet port. The fact that the module is contained likewise means that the module may be operated without need for further unit operations, and it may be viewed as a single integrated skid where excipients and API are loaded at a front end, i.e. the releasable inlet conduits, and it will then deliver tablets at the back end, i.e. the releasable outlet port. The term "module" should be interpreted as meaning either a single contained structure or a framework which enables the individual units of the framework to be assembled and tested prior to final installation. In this manner, delivery and final installation is made simpler and more cost-effective. The unit operations or components can be mounted in a skid-like frame structure. These unit operation frames are modular and can be connected to each other depending on the processing line layout. The frames can be moved from one processing room to another, or from one processing plant to another. The flexibility of the contained module allows that it is designed and constructed as a portable unit, which may easily be integrated with an existing process line in a pharmaceutical plant. The desired level of containment depends on, i.a., the toxicity of the API, and equipment should be chosen accordingly. In theory, containment levels approaching zero are conceivable, but may probably only be attained by such a radical approach as placing the entire tablet press into an isolator. However, handling such an isolated unit requires very large amounts of time for dismounting, cleaning and reassembly, which in turn leads to unacceptably long downtimes. In practice, a desired level of containment is chosen among such levels as contained or dust-tight (10-100 mcg/m$^3$), high contained (1-10 mcg/m$^3$) and total contained (<1 mcg/m$^3$), and suitable equipment is chosen in accordance with the desired containment levels. The term "contained" within the context of the present application is defined by its level of containment according to the SMEPAC test, or any corresponding, suitable measurement, and is thus defined as at least dust-tight according to the above-identified standard.

Access to the contained module during operation is provided via inlets and outlets, which may take any suitable form. In the embodiment shown and described in the above, releasable inlet conduits and product, e.g. tablets, may be obtained from a releasable outlet port. In this context "releasable" means that the respective inlet conduits and outlet port are generally closed, but may be opened to allow application of API and excipients to the module or remove tablets from the module, respectively. It is preferred that the releasable inlet conduits are designed so as to each comprise a conduit connection allowing the conduit connection to be connected to a complementary connection, so that when the connection of the inlet conduit is connected with the complementary connection, the releasable inlet conduit is "open". The complementary connection may be provided on a container for an API or an excipient; thereby the container for the API or the excipient may be connected with the respective inlet conduit via its connection and the complementary connection on the container. This will allow the API or excipient to be applied to the module, as appropriate, via the now open inlet conduit. Likewise, the outlet port may also comprise a connection which may be connected via a complementary connection on a container for product exiting the module via the outlet port. A connection of an inlet conduit and its complementary connection on one container may be different from that of another inlet conduit and its respective complementary connection on another container, so that for example, a container for an API may only be connected to the inlet conduit for the API, and the excipient container only to the inlet conduit for the excipient, and similarly the connection of the outlet port and its complementary connection on the product container may be different from those of either or both of the inlet conduits. Advantageously, the module should be allowed to be stripped down for cleaning in a contained manner, such that parts may be safely removed for washing and quickly replaced with clean components to allow the unit to resume production in the shortest practical time and without the delays and costs associated with traditional CIP.

Figure 2A:
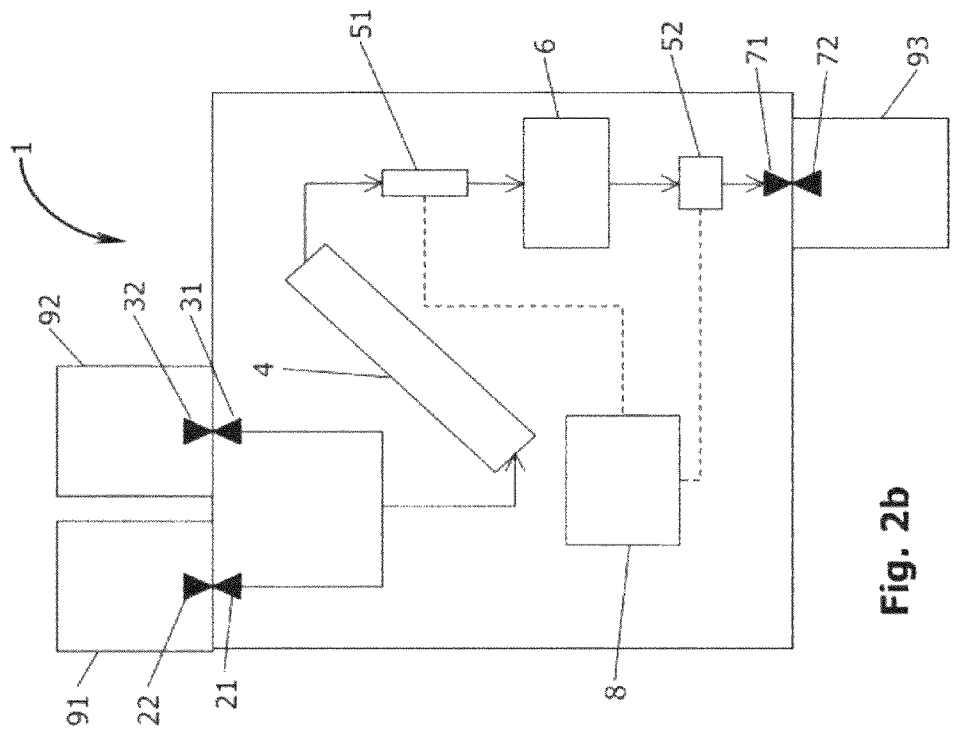
FIG. 2a shows a schematic drawing of another embodiment of a contained module of the invention with containers for API, excipient and product disconnected.
Figure 2B:
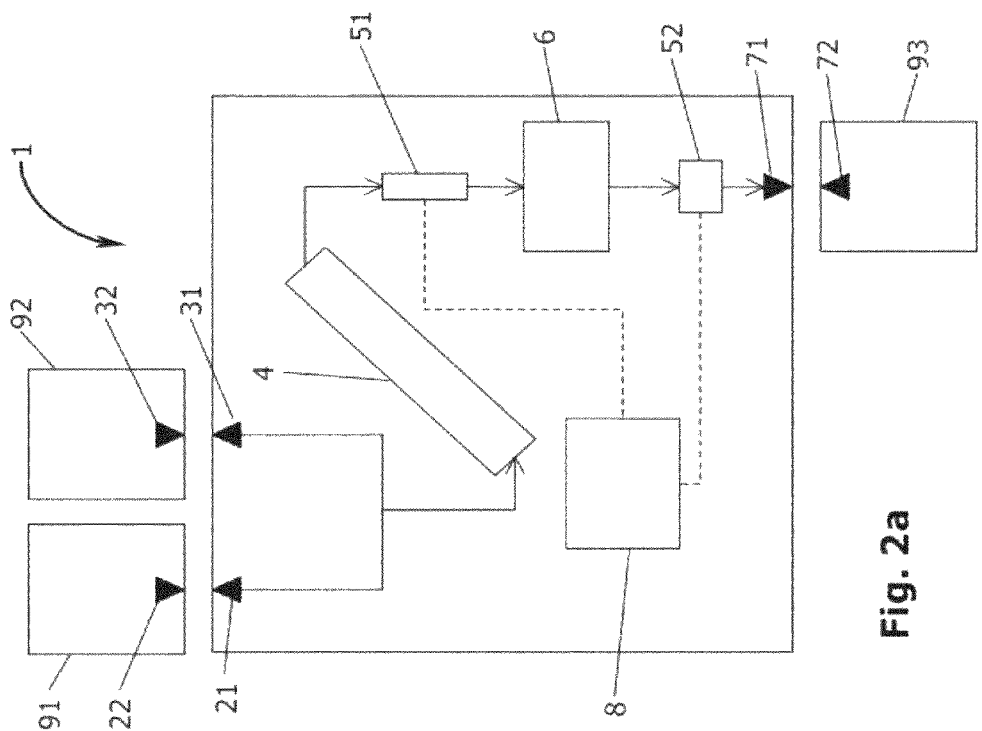
FIG. 2b shows a schematic drawing corresponding to FIG. 2a of an embodiment of a contained module of the invention with containers for API, excipient and product connected.

FIGS. 2a and 2b show an embodiment of the module, wherein the inlet conduits and the outlet port of the module 1 each comprise a connection 21,31,71 for connecting to a complementary connection 22,32,72 located on respective containers for API 91, excipient 92 and tablets 93. The releasable inlet conduit or outlet port connections are preferably in the form of so-called split valves having two mating valve members, such as split butterfly valves. This type of connection permits closing of the conduit or port passage and subsequently separation of the two valve parts, whereby each of the two mating valve members remains in its corresponding valve part closing the valve opening, practically without any leakage of the product to the surroundings. A suited example of a split valve is that sold under the name "Buck Valve®" by GEA Pharma Systems AG (Bubendorf, Switzerland). Each set 21 & 22, 31 & 32, 71 & 72 of connection and complementary connection are preferably of a split butterfly valve-type, such as Buck Valves. FIG. 2a schematically shows the containers 91,92,93 disconnected from the module 1, whereas in FIG. 2b the containers 91,92,93 are shown as connected to the module 1 thus allowing access for the API and the excipient to the module 1 and allowing tablets to exit the module 1.

Figure 3:
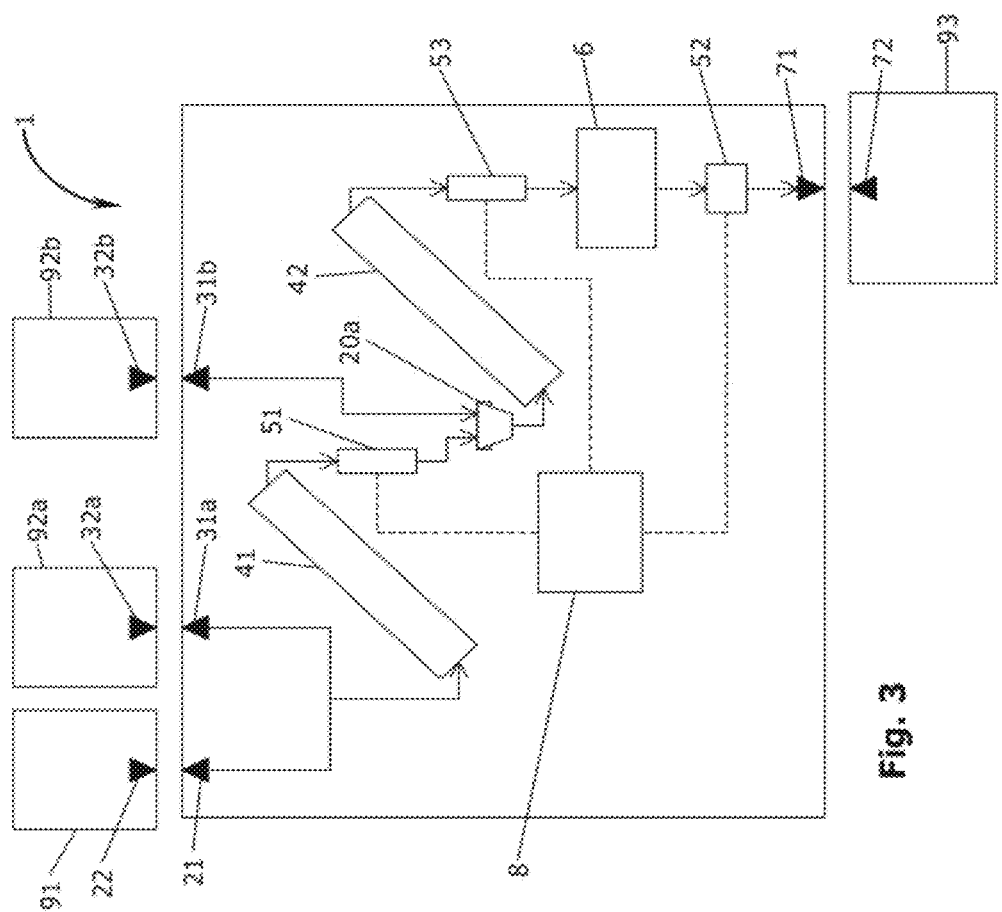
FIG. 3 shows a schematic drawing of a contained module according to a further embodiment of the invention.

FIG. 3 shows yet another embodiment of the module 1 of the invention. In this embodiment, the module 1 is designed for two different excipients, so that an initial excipient may enter the module 1 from container 92*a* when the complementary connection 32*a* is mated with connection 31*a*. A further excipient, such as a lubricant, e.g. magnesium stearate, may enter the module 1 from container 92*b* when the complementary connection 32*b* is mated with connection 31*b*. The further excipient may be conducted, e.g. via hopper 20*a*, together with the material stream leaving an initial mixing unit 41, e.g. a granulate of API and initial excipient, to a further mixing unit 42. The material stream from mixing unit 42 may be analysed using analytical sensor 53 before entering the tablet press 6.

The module is not limited to any specific API, and API's may be in a dry, e.g. powdery or granular, form, or the API may be in a liquid form, such as a solution or an inherently liquid API. The module is not limited to a single API, and the module may comprise several inlet conduits for different APIs with the intention to produce controlled release tablets capable of simultaneous or consecutive release of the different APIs. Likewise, the excipient may be in the form of a powder or granules, in solution or liquid. Examples of commonly employed excipients comprise anti-adherents, binders, coatings, disintegrants, fillers and diluents, flavours, colours, glidants, lubricants, preservatives, sorbents, and sweeteners; specific examples of the different types of excipient are well-known within the art.

The module of the invention is not limited to a single inlet conduit for an API and a single inlet conduit for excipients. It is also conceivable that the module comprises an inlet conduit for an API and multiple inlet conduits for different excipients, as described in the embodiment of FIG. 3 and indicated in the overview of the process line of FIG. 4. The module may also comprise several inlet conduits for different APIs. Likewise, the module may comprise several mixing units located in the process line as needed. For example, the module may comprise an inlet conduit for an API and an inlet conduit for a first excipient, such as a binder, a filler, a diluent, a flavour, a colour or the like, which inlet conduits are in fluid communication, e.g. via a hopper, with an inlet of a first mixing unit. This module may then comprise another inlet conduit for a second excipient, such as a lubricant, which inlet conduit for the second excipient is in fluid communication with an inlet of a second mixing unit. An outlet of the first mixing unit may also be in fluid communication with the inlet of the second mixing unit in order to obtain at an outlet of the second mixing unit a mixture of the material from the first mixing unit, i.e. API and first excipient, with the second excipient, e.g. lubricant. The inlet of the second mixing unit may comprise a hopper or the like to receive the material stream from the first mixing unit and the second excipient from its inlet conduit. The material stream from an outlet of the second mixing unit may then be in fluid communication with an inlet of the tablet press to produce tablets from the mixture of the API and the first excipient with the second excipient. The tablet press is, via an outlet of the tablet press, in fluid communication with the outlet port for tablets. The module may comprise analytical sensors positioned to analyse material streams in the outlets of any of the mixing units, as well as analytical sensors positioned to analyse the tablets produced in the tablet press.

The relative position in the process line of inlet conduits for API and/or excipient(s) and mixing units may thus depend on the function of a given excipient. In particular, introduction of a further excipient into the process line may taken into account the desired effect of the further excipient compared to the stage of API and initial excipients being processed in the module. Typically, an inlet conduit for a further excipient will introduce the excipient downstream of a mixing unit so that the excipient may be mixed with the mixture, e.g. homogeneous mixture, of the API and the initial excipient in the material stream from the downstream mixing unit; the introductory point of the further excipient will then be followed by a further mixing unit in order to mix the further excipient with the mixture of the API and the initial excipient. The same considerations apply when more than one API is introduced into the process line, e.g. when it is desired to produce a tablet containing more than one API, e.g. a controlled release tablet with simultaneous release of multiple APIs, or a controlled release tablet with consecutive release of different APIs, e.g. a multilayered tablet.

The module may be established in a room in a building, or in a container designed for the purpose. The module has necessary connections such as e.g. power connections, controlled atmosphere/venting, CIP (Cleaning-In-Place), possible granulation liquid, etc. Regarding the cleaning of the module, it is possible to wash in-line, on-line or off-line, regarding which principle is most advantageous according to specific fields of application of the contained module. The module may be contained by being in a confined space, but the concept of "containment" includes designing the individual parts of the process equipment to be "contained", all in all making up a "module" in the sense of containment.

The module may also comprise other unit operations as necessary for a given tabletting process. For example, unit operations may be included to dry components introduced into the module, or feeders to move components from one unit operation to the next. Other relevant unit operations are mills, compactors, etc.

The contained module may thus be seen as a single piece of equipment, allowing inlet of API's and excipients at one end, and outlet of tablets at the other. Preferably, the single piece of equipment includes a physical confinement of the interfaces of the contained module. Such confinement may for instance be in the form of the above-mentioned designed valves, possibly supplemented with specially adapted tubing between the individual units of the module.

Referring now to FIGS. 4 to 7, examples of conceivable process lines for carrying out the method and incorporating the contained module according to the invention will be described. The analytical sensor or sensors present at certain positions in the contained module is/are not indicated. Only units denoted by reference numerals form part of the process line; other units remain in the individual FIGS. 4 to 7 for reasons of convenience.

Figure 4:
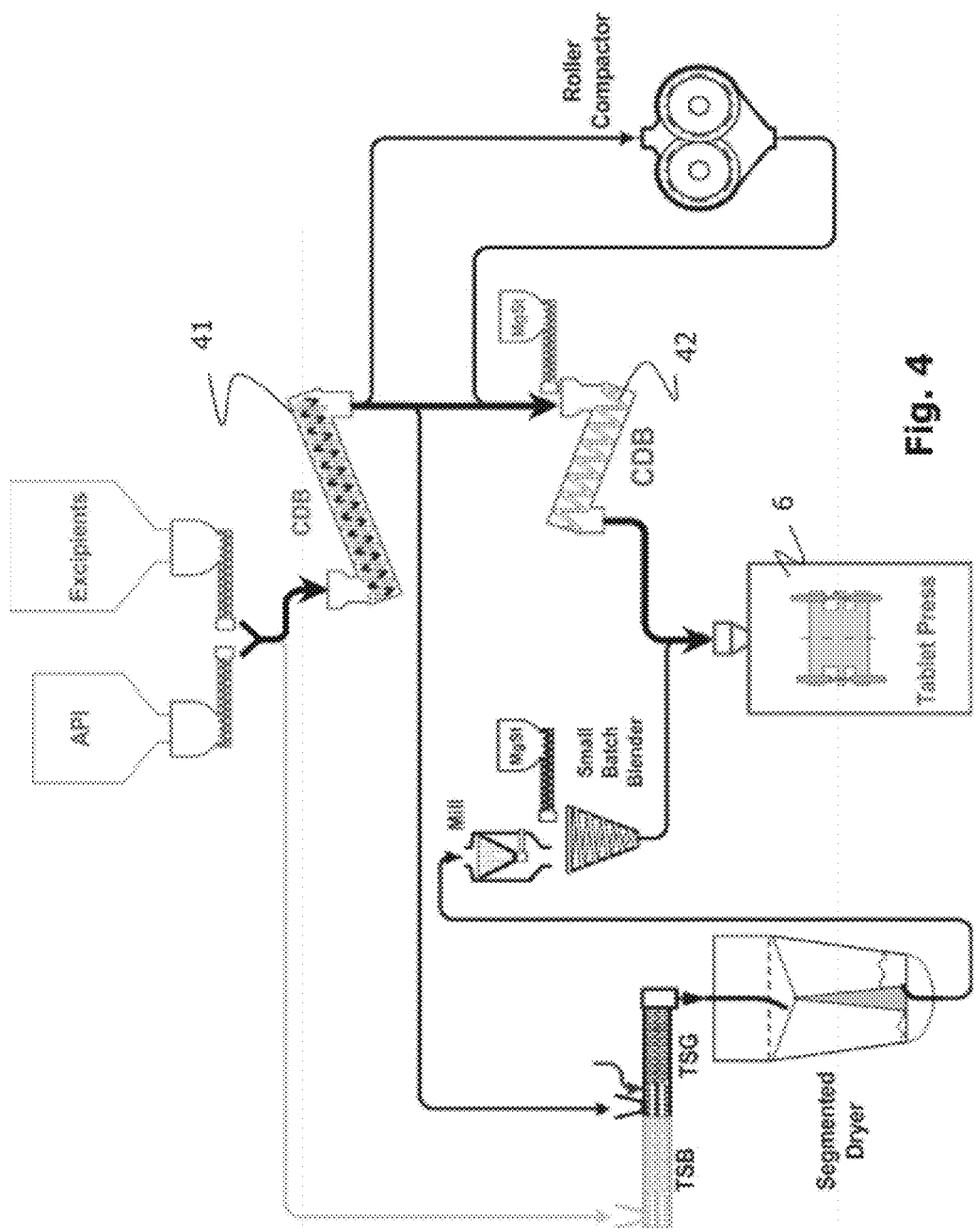
FIG. 4 shows a schematic overview of a process line for carrying out continuous production of tablets and corresponding in substance to the embodiment of the contained module of FIG. 3.

In the overview of FIG. 4, the module 1 is designed for two different excipients, so that an initial excipient may enter the module 1 at the inlets to the module, together with the API, and is processed in the first mixing unit 41, which is in the form of a continuous dry blender (CDB). A further excipient, such as a lubricant, e.g. magnesium stearate (MgSt), may enter the module 1 and is brought together with the material stream leaving the initial mixing unit 41 into a further mixing unit 42, which may also be in the form of a continuous dry blender. The material stream may be analysed in any suitable manner and at any suitable positions as described in the above before entering the tablet press 6.

Figure 5:
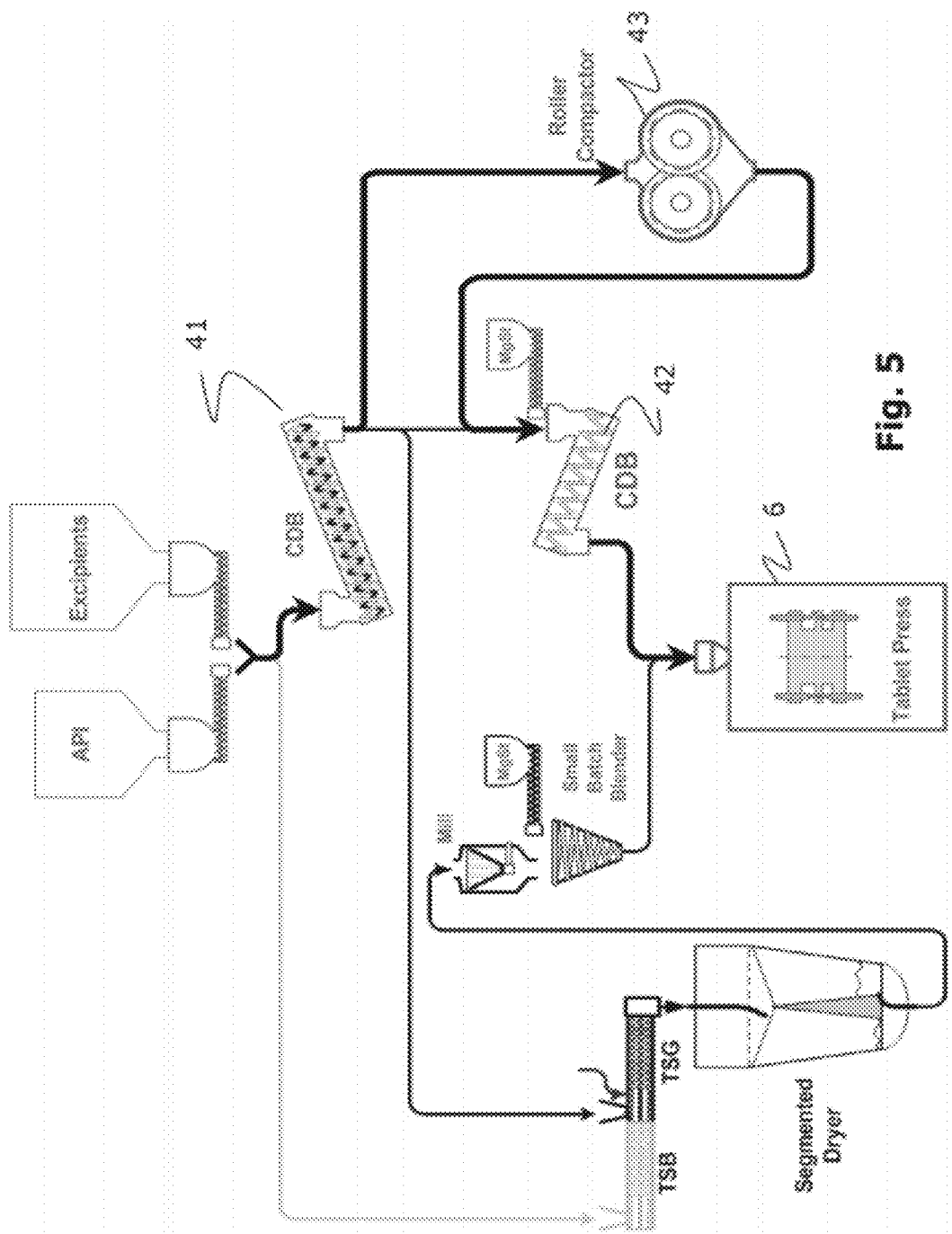
FIGS. 5 to 7 show overviews corresponding to FIG. 4 of further embodiments.

Instead of directing the material stream directly from the initial mixing unit 41 to the further mixing unit 42, the material stream of the process line overview of FIG. 5 is directed via a roller compactor 43 compacting the material before it enters the further mixing unit 42.

Figure 6:
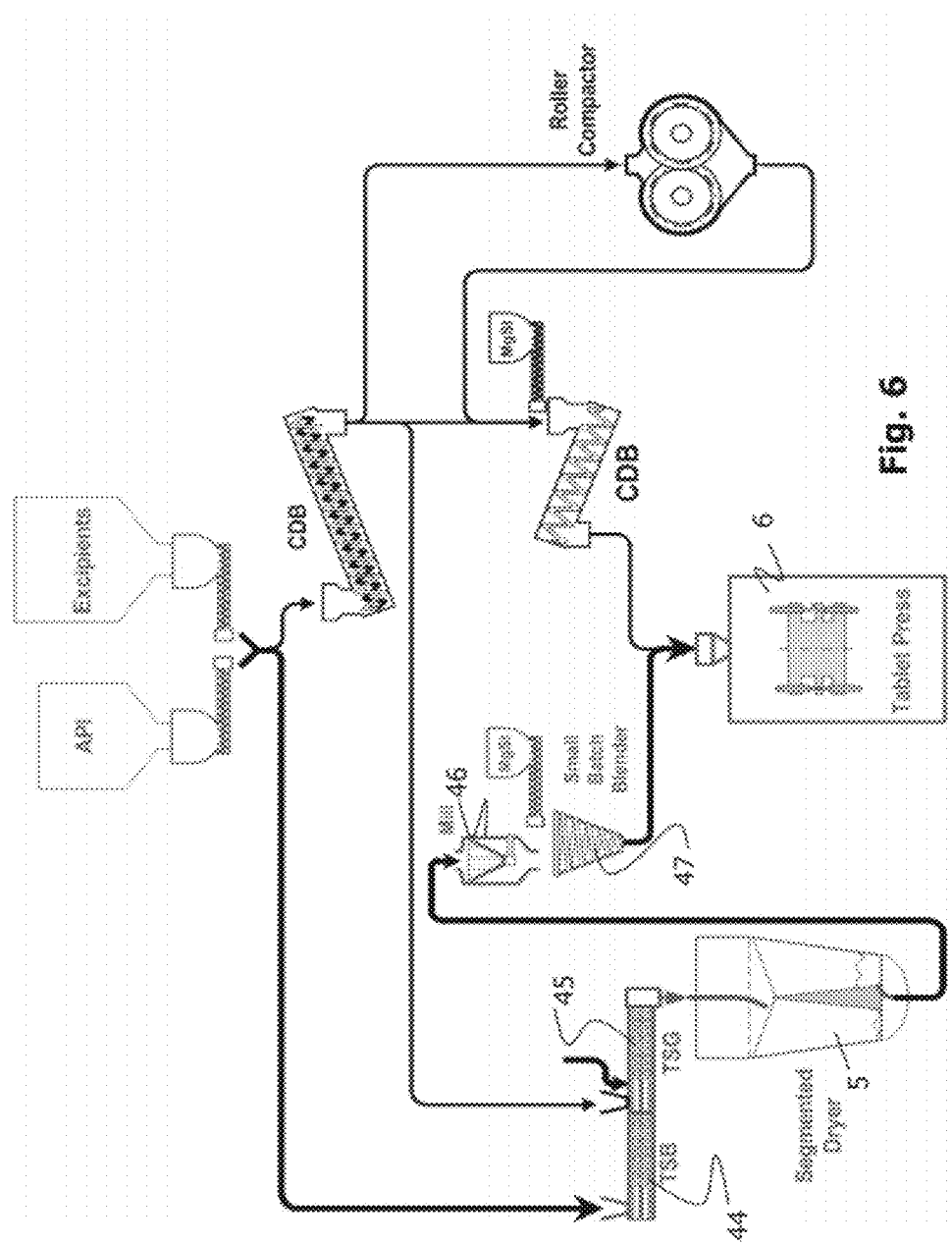

Alternatively, the mixing unit comprises a twin screw blender 44 (TSB) as indicated in FIG. 6, to which the material stream of API and excipients entering the module through the inlets is conducted. The twin screw blender 44 is followed by a twin screw granulator 45 (TSG) processing the material stream further. Following this operation, the material stream is guided to segmented dryer 5 and further to a mill 46. The further excipient, such as a lubricant, e.g. magnesium stearate, enters the module at this point and is brought together with the existing material stream, this mixture being blended in a small batch blender 47 before being fed to the tablet press 6.

Figure 7:
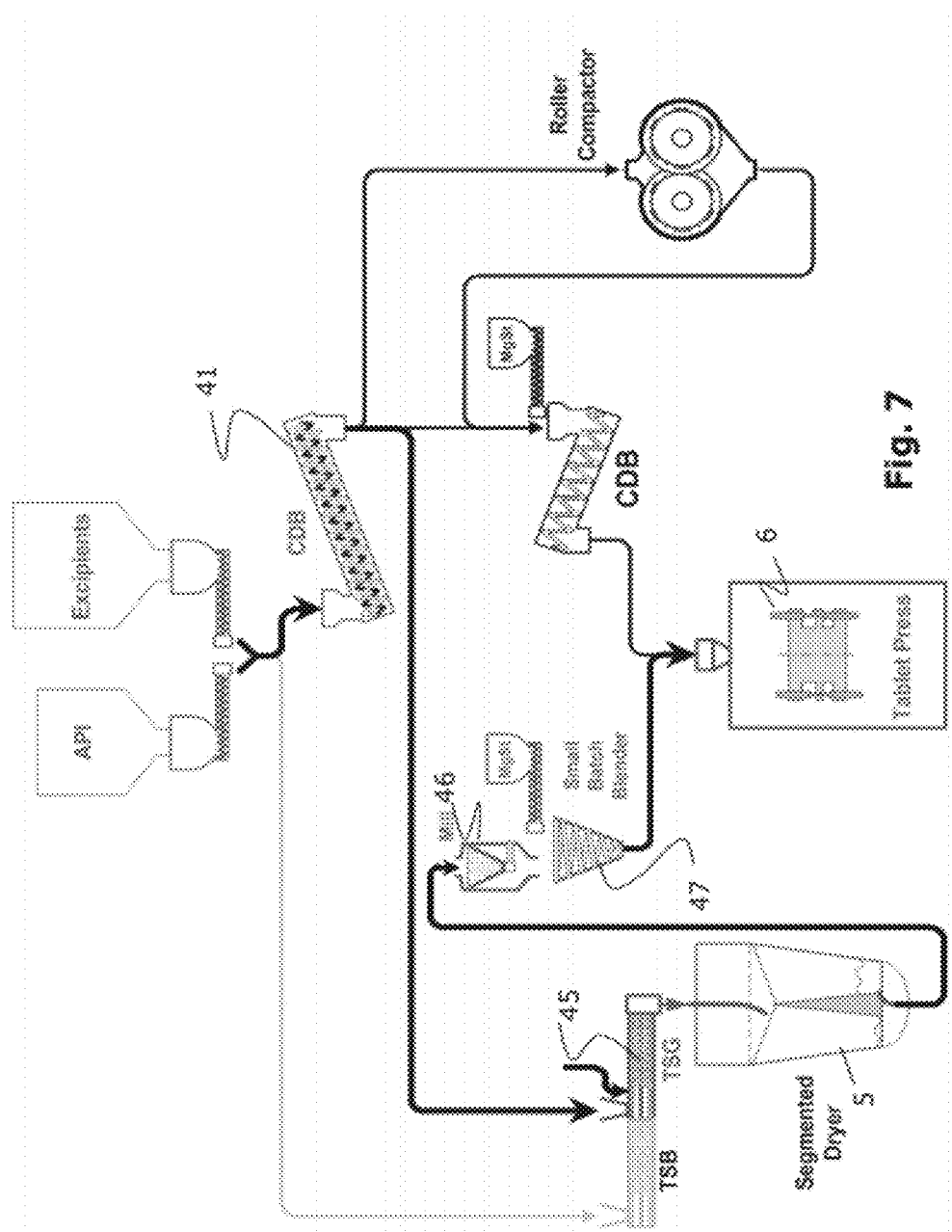

As a further alternative, shown in FIG. 7, the material streams of API and excipients are brought together in the initial mixing unit 41, in the form of continuous dry blender, and then brought to the twin screw granulator 45 (thus not via the twin screw blender 44), and further through the dryer 5, mill 46, small batch blender 47 and then to tablet press 6.

In the following, operation of the contained module 1 according to the invention will be described in further detail.

With "continuous" is meant that the process running in the module is under conditions approaching or at a steady-state meaning that the application rates of API and excipients (as expressed in mass units) are approximately identical to the production rate of tablets (likewise expressed in mass units). The application and production rates do not, however, need to be the same throughout for a given process and may be adjusted as desired. When a container for an API or an excipient is empty, it may be disconnected from its respective releasable inlet and be replaced with a full container without need for interrupting the process. Likewise, if a product container is full it may also be replaced with an empty container without need for interrupting the process, the releasable inlet conduits and the releasable outlet port thus allowing that the module is operated on a continuous basis. A further and crucial factor in the fully continuous operation is that the speed of tablet press is controlled in accordance with the upstream unit operations. This means that the raw material entering into the module via the API and excipients inlets is processed in the mixing unit or units, compacted, dried etc. at any suitable rate. In the upstream process, analysis, control and adjustment is carried out to bring the powder flow within any set standard for the finished tablets. In case the rate of powder fed to the inlet of the tablet press decreases due to for instance parameter adjustment upstream of the press, the speed of the tablet press is lowered accordingly, and vice versa. At the inlet of the tablet press, all parameters of the powder flow are thus within the standard set. As a result of these provisions, the entire module and process line may be run with a minimum of aggregated material awaiting further processing, i.e. with a minimum of buffer volume. The disadvantages connected with large buffer volume and consequent back-mixing are reduced or even eliminated. Minimizing the buffer volume and back-mixing, enables product traceability throughout the line, for instance by time stamping, enabling further to join and correlate tablet data with data of the powder that is used to make that particular tablet or subset of tablets. Correlation of tablet data with the correct powder data enables better process understanding The method performed in the module of the invention may be controlled in any matter by the control unit. For example, the control unit may contain a pre-programmed sequence of events, or the control unit may be operated manually by an operator to control the individual process steps, or a combination of manual and pre-programmed operation. It is preferred however, that the control unit is programmed to employ data from the data processing unit to control the process parameters in a "feed-back" type operation or in a "feed-forward" type operation. Thus for example, a parameter may be analysed by an analytical sensor downstream or upstream of a certain processing step so that the data processing unit may send a signal to the unit operation of the step upstream or downstream of the analysis point in order to adjust the processing step based on the data from the sensor. An adjustment of a process step upstream or downstream of an analysis may then in turn also lead to an adjustment of a processing step downstream or upstream of the analysis point in order to maintain an overall steady state in the process. In this way the process of the module may be controlled to obtain a higher quality of tablets produced in the module. Concluding, the control of the module according to the invention by the method disclosed entails using the information derived from the mathematical model. This includes predicting for instance dissolution, and then continuously or "quasi" continuously provide feedback to the steps in the process including granulation and drying and tabletting. The information from the tablet press is used for instance for weight control variation to feed back and adjust the properties of the granulation process. The information from the tablet press, such as e.g. the ejection force, may be used to control the addition and blending of the lubricant. The information derived from the granulation and drying steps may be used to adjust the settings of the tablet press, e.g. feeder settings and compression profile. The compression roller compensation system may be used to enable the compression profile to be controlled independent of the speed of the tablet press.

A continuous process according to the invention may run for extended periods of time, e.g. 60 hours or more. The control unit may therefore also comprise a timing device, and a module with an analytical sensor may have an appropriately programmed control unit for carrying out so-called auto-analysis according to predetermined schedule. The control unit may then employ data from the analytical sensor(s) to maintain desired conditions by implementing adjustments to the process steps or maintaining process parameters unadjusted as appropriate. The control unit may also record an analysis history of the process as well as a history of any adjustments made in the process.

Figure 8:
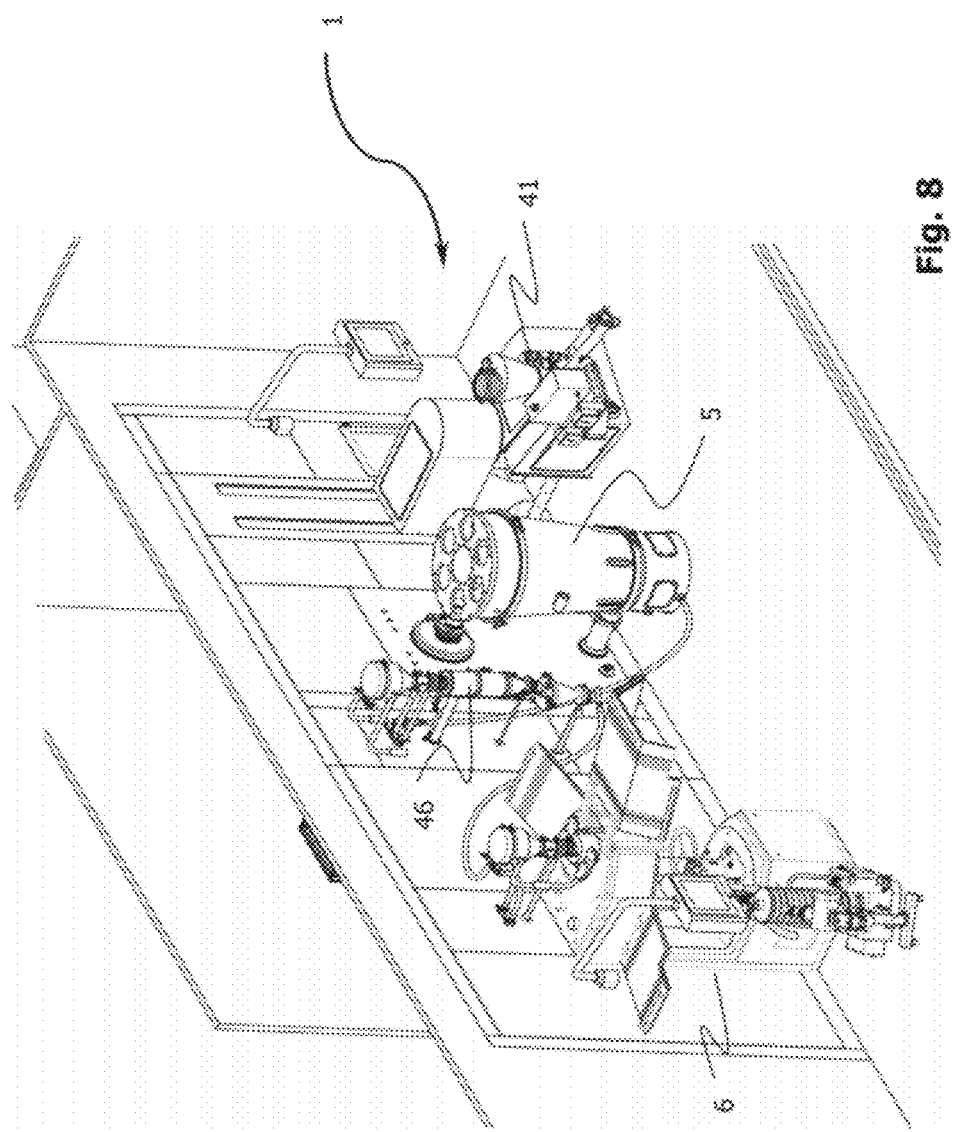
FIG. 8 shows a perspective view of an embodiment of the contained module according to the invention.

One example of a conceivable set-up of an embodiment of the contained module according to the invention will be described referring to FIG. 8. In the contained module generally designated 1, an initial mixing unit 41 is shown, being in fluid communication with inlets for API and excipients, for instance in the form of a powder hopper. The contained module 1 furthermore comprises a feeding device, such as a twin screw feeder. The mixing unit may be of the type Consigma™ (Collette), which is a continuous high shear granulation and drying system designed for plug flow, i.e. operating on a first-in first-out principle, thus avoiding the above-mentioned undesirable back mixing. Furthermore, the contained module 1 includes a segmented fluid bed dryer 5. The mixing unit 41 may as shown be installed on a post hoist to allow for easy manual powder loading and then hoisted above dryer, for a direct vertical, gravitational feed into the dryer. Alternatively, the Consigma™ (or other mixing unit) can be placed below, to be fed with bigger powder IBC's and a pneumatic wet conveying into the dryer 5. Reference numeral 46 indicates a mill, provided with an evaluation unit (not shown) and may also be provided with a small batch blender (not shown), to add magnesium stearate or other lubricant, or other further excipients. Finally, the contained module 1 includes a tablet press 6. The shown arrangement of the contained module is a horizontal, single floor set-up including pneumatic conveying between the individual units. Alternatively one could use a vertical set-up, with gravitational transport rather than pneumatic.

The invention should not be regarded as being limited to the embodiments shown and described in the above. Several modifications and combinations are conceivable within the scope of the appended claims.

The invention claimed is:

1. A module for production of tablets, the module comprising:
   at least one inlet for an active pharmaceutical ingredient (API);
   at least one inlet for an excipient;
   at least one mixing unit;
   a tablet press;
   at least one outlet for tablets; and
   a control unit configured to receive data from the at least one analytical sensor and send commands to the tablet press to control the speed of the tablet press to maintain a continuous process;
   said inlets being in fluid communication with an inlet of the at least one mixing unit, an outlet of the at least one mixing unit is in fluid communication with an inlet of the tablet press, and an outlet of the tablet press is in fluid communication with the outlet for tablets;
   wherein
   the module is contained to have a level of containment below 100 mcg/m$^3$;
   at least one analytical sensor is provided, said at least one analytical sensor being positioned to analyze the contents or properties upstream of the tablet press, and
   said inlets comprise a releasable inlet conduit for an active pharmaceutical ingredient (API) and a releasable inlet conduit for an excipient, and said outlet a releasable outlet port for tablets, the releasable inlet conduits being in fluid communication with the inlet of the mixing unit, and the outlet of the tablet press is in fluid communication with the releasable outlet port for tablets,
   a fully continuous process is provided,
   the control unit is configured to send commands to the at least one inlet for API, the at least one inlet for the excipient, the mixing unit and the tablet press, and
   the at least one inlet for the API, the at least one inlet for the excipient, the at least one mixing unit, and the tablet press are directly connected to each other by a conduit without an intermediate containment vessel provided therebetween.

2. A contained module according to claim 1, wherein the module has a level of containment below 10 mcg/m$^3$.

3. A contained module according to claim 1, wherein the analytical sensor is a spectroscopic analytical sensor.

4. A contained module according to claim 1, further comprising an additional mixing unit.

5. A contained module according to claim 1, further comprising a drying unit.

6. A contained module according to claim 1, wherein said at least one analytical sensor is positioned at the at least one of the inlets to the contained module, the inlet of the mixing unit, the outlet of the mixing unit, and at the inlet of the tablet press.

7. A contained module according to claim 1, wherein the contained module is designed as a single piece of equipment including a physical confinement of the interfaces of the contained module.

8. A contained module according to claim 3, wherein the spectroscopic analytical sensor is an ultraviolet sensor.

9. A module for production of tablets, the module comprising:
   at least one inlet for an active pharmaceutical ingredient (API);
   at least one inlet for an excipient;
   at least one mixing unit;
   a tablet press;
   at least one outlet for tablets; and
   a control unit configured to receive data from the at least one analytical sensor and send commands to the tablet press to control the speed of the tablet press to maintain a continuous process;
   said inlets being in fluid communication with an inlet of the at least one mixing unit, an outlet of the at least one mixing unit is in fluid communication with an inlet of the tablet press, and an outlet of the tablet press is in fluid communication with the outlet for tablets;
   wherein
   the module is contained, defined by its level of containment as at least dust-tight below 100 mcg/m$^3$;
   at least one analytical sensor is provided, said at least one analytical sensor being positioned to analyze the contents or properties upstream of the tablet press, and
   said inlets comprise a releasable inlet conduit for an active pharmaceutical ingredient (API) and a releasable inlet conduit for an excipient, and said outlet a releasable outlet port for tablets, the releasable inlet conduits being in fluid communication with the inlet of the mixing unit, and the outlet of the tablet press is in fluid communication with the releasable outlet port for tablets,
   a fully continuous process is provided,
   the control unit is configured to send commands to the at least one inlet for API, the at least one inlet for the excipient, the mixing unit and the tablet press,
   the at least one inlet for the API, the at least one inlet for the excipient, the at least one mixing unit, and the tablet press are directly connected to each other by a conduit without an intermediate containment vessel provided therebetween, and
   the contained module is designed as a single piece of equipment including a physical confinement of the interfaces of the contained module.

10. A contained module according to claim 1, wherein the at least one analytical sensor is positioned to analyze the contents or properties of a material stream from the mixing unit upstream of the tablet press.

11. A contained module according to claim 10, wherein at least one further analytical sensor is provided and said at least one further analytical sensor is positioned at the at least one of the inlets to the contained module, the inlet of the mixing unit, and at the inlet of the tablet press.

* * * * *